United States Patent
Bode

(12) 
(10) Patent No.: US 6,612,481 B2
(45) Date of Patent: Sep. 2, 2003

(54) WELLSCREEN

(75) Inventor: Jeffrey M. Bode, The Woodlands, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 34 days.

(21) Appl. No.: 09/917,960

(22) Filed: Jul. 30, 2001

(65) Prior Publication Data

US 2003/0021922 A1 Jan. 30, 2003

(51) Int. Cl.⁷ ............................................. B23K 31/02
(52) U.S. Cl. .................. 228/143; 228/145; 228/146; 228/173.6; 29/896.62; 210/170
(58) Field of Search ................. 228/141.1, 143–146, 228/149–150, 164, 173.1, 173.6; 210/170; 166/278, 157, 205, 280, 227–236; 29/896.62

(56) References Cited

U.S. PATENT DOCUMENTS

| | | | |
|---|---|---|---|
| 761,518 A | 5/1904 | Lykken | |
| 1,324,303 A | 12/1919 | Carmichael | |
| 1,545,039 A | 7/1925 | Deavers | |
| 1,561,418 A | 11/1925 | Duda | |
| 1,569,729 A | 1/1926 | Duda | |
| 1,597,212 A | 8/1926 | Spengler | |
| 1,930,825 A | 10/1933 | Raymond | 153/81 |
| 2,383,214 A | 8/1945 | Prout | 153/82 |
| 2,499,630 A | 3/1950 | Clark | 153/81 |
| 2,627,891 A | 2/1953 | Clark | 153/82 |
| 2,663,073 A | 12/1953 | Bieber et al. | 29/148 |
| 2,898,971 A | 9/1959 | Hempel | 153/82 |
| 3,087,546 A | 4/1963 | Wooley | 166/46 |
| 3,195,646 A | 7/1965 | Brown | 166/208 |
| 3,467,180 A | 9/1969 | Pensotti | 165/180 |
| 3,818,734 A | 6/1974 | Bateman | 72/75 |
| 3,911,707 A | 10/1975 | Minakov et al. | 72/76 |
| 4,069,573 A | 1/1978 | Rogers, Jr. et al. | 29/421 R |
| 4,127,168 A | 11/1978 | Hanson et al. | 166/123 |
| 4,159,564 A | 7/1979 | Cooper, Jr. | 29/727 |
| 4,288,082 A | 9/1981 | Setterberg, Jr. | 277/125 |
| 4,324,407 A | 4/1982 | Upham et al. | 277/27 |
| 4,343,359 A * | 8/1982 | Krause | 166/233 |

(List continued on next page.)

FOREIGN PATENT DOCUMENTS

| | | | | |
|---|---|---|---|---|
| EP | 0 674 095 A2 | 3/1995 | | E21B/43/08 |
| EP | 0 961 007 A2 | 12/1999 | | E21B/33/10 |
| EP | 1 152 120 A2 | 11/2001 | | E21B/43/10 |
| GB | 002306894 A * | 5/1997 | | |
| GB | 2 306 894 A | 5/1997 | | B01D/39/12 |
| GB | 2 320 734 A | 7/1998 | | E21B/33/127 |
| JP | 401258865 A * | 10/1989 | | |
| WO | WO 93/24728 | 12/1993 | | E21B/17/10 |
| WO | WO 99/18328 | 4/1999 | | E21B/23/01 |
| WO | WO 99/23354 | 5/1999 | | E21B/43/10 |
| WO | WO 00/31375 | 6/2000 | | E21B/43/10 |

OTHER PUBLICATIONS

PCT International Search Report, International Application No. PCT/GB 02/02882, dated Sep. 19, 2002.

U.S. patent application Ser. No. 09/469,643, Metcalfe et al., filed Dec. 22, 1999.

U.S. patent application Ser. No. 09/469,526, Metcalfe et al., filed Dec. 22, 1999.

*Primary Examiner*—Tom Dunn
*Assistant Examiner*—Kiley Stoner
(74) *Attorney, Agent, or Firm*—Moser, Patterson & Sheridan, L.L.P.

(57) ABSTRACT

An apparatus and method of manufacturing a wellscreen for subterranean use in oil, gas, and water wells, incorporating numerous automated processes, whereby layers of mesh are continuously sintered to a perforated strip, formed into a tube, placed over a perforated base pipe, and sealed with end rings.

5 Claims, 5 Drawing Sheets

U.S. PATENT DOCUMENTS

| | | | |
|---|---|---|---|
| 4,376,091 A | * | 3/1983 | Netkowicz et al. .......... 376/283 |
| 4,429,620 A | | 2/1984 | Burkhardt et al. ............. 91/395 |
| 4,531,581 A | | 7/1985 | Pringle et al. ............... 166/120 |
| 4,588,030 A | | 5/1986 | Blizzard ..................... 166/120 |
| 4,697,640 A | | 10/1987 | Szarka ....................... 166/120 |
| 4,780,213 A | * | 10/1988 | Ogletree ..................... 210/679 |
| 4,848,469 A | | 7/1989 | Baugh et al. ................ 166/382 |
| 5,083,608 A | | 1/1992 | Abdrakhmanov et al. .... 166/55 |
| 5,271,472 A | | 12/1993 | Leturno ...................... 175/107 |
| 5,293,935 A | | 3/1994 | Arterbury et al. ........... 166/228 |
| 5,310,000 A | * | 5/1994 | Arterbury et al. ........... 166/296 |
| 5,318,119 A | * | 6/1994 | Lowry et al. ................ 166/228 |
| 5,409,059 A | | 4/1995 | McHardy .................... 166/208 |
| 5,435,400 A | | 7/1995 | Smith .......................... 175/61 |
| 5,472,057 A | | 12/1995 | Winfree ....................... 175/57 |
| 5,560,426 A | | 10/1996 | Trahan et al. ................ 166/120 |
| 5,664,628 A | * | 9/1997 | Koehler et al. .............. 166/369 |
| 5,685,369 A | | 11/1997 | Ellis et al. ................... 166/195 |
| 5,881,812 A | * | 3/1999 | Malbrel et al. .............. 166/278 |
| 5,901,787 A | | 5/1999 | Boyle ......................... 166/135 |
| 5,909,773 A | * | 6/1999 | Koehler et al. .............. 166/277 |
| 5,938,925 A | * | 8/1999 | Hamid et al. ............. 210/497.1 |
| 5,979,551 A | * | 11/1999 | Uban et al. .................. 166/233 |
| 6,012,522 A | | 1/2000 | Donnelly et al. ............ 166/276 |
| 6,021,850 A | | 2/2000 | Wood et al. ................. 166/380 |
| 6,098,717 A | | 8/2000 | Bailey et al. ................ 166/382 |
| 6,325,148 B1 | | 12/2001 | Trahan et al. ................ 166/297 |
| 6,352,111 B1 | * | 3/2002 | Bode et al. .................. 166/265 |
| 6,382,318 B1 | * | 5/2002 | Whitlock ..................... 166/278 |
| 6,415,509 B1 | * | 7/2002 | Echols et al. ............. 29/896.62 |
| 6,425,444 B1 | | 7/2002 | Metcalfe et al. |
| 6,446,323 B1 | | 9/2002 | Metcalfe et al. |
| 6,457,532 B1 | | 10/2002 | Abercrombie |
| 6,457,533 B1 | | 10/2002 | Metcalfe |
| 6,527,049 B2 | | 3/2003 | Metcalfe et al. |
| 2001/0003313 A1 | * | 6/2001 | Doesburg et al. |
| 2002/0088744 A1 | * | 7/2002 | Echols et al. |
| 2002/0100169 A1 | * | 8/2002 | Echols et al. |
| 2002/0104217 A1 | * | 8/2002 | Echols et al. |
| 2002/0125007 A1 | * | 9/2002 | McGregor et al. |

* cited by examiner

WELLSCREEN

BACKGROUND OF THE INVENTION

1. Field of the Invention

The present invention generally relates to an apparatus and method of manufacturing a wellscreen for subterranean use in oil, gas, and water wells.

2. Description of the Related Art

The problem of reliably removing particulates from liquids or gasses (production fluids) exists in many types of wells including oil and gas wells, water wells, geothermal wells, and wells for ground remediation. Typical particulates needing to be filtered out are sand and clay including unconsolidated particulate matter, also known as "formation sand". A major problem in producing hydrocarbon fluids from unconsolidated formations is the intrusion of formation sand, which is typically very fine, into production fluid and equipment. The presence of sand in production fluid often leads to the rapid erosion of expensive well machinery and hardware.

Subterranean filters, also known as "sand screens" or "wellscreens", have been used in the petroleum industry for years to remove particulates from production fluids. They are generally tubular in shape, comprising a perforated inner member or pipe, at least one porous filter layer wrapped around and secured to the pipe, and an outer cover. The wellscreens are used where fluid enters a production string. For example, a common way to achieve the filtration is to mount a wellscreen in the production string near the area of fluid production such that the produced fluid must pass through the filter layers and into the perforated pipe prior to entering the production string and being pumped to the surface.

A typical method of constructing a wellscreen involves wrapping and seam-welding mesh layers of filtering material around a perforated base pipe. An alternative method involves forming a tube of the mesh material, seam welding it longitudinally and then sliding it over the perforated base pipe. The mesh layers typically consist of sintered mesh filter elements and more coarse wire mesh drainage elements. A protective outer shroud consisting of a perforated tube is then placed over the mesh layers and the perforated base pipe and end rings are then welded in place to seal the ends of the filter elements and protective shroud to the base pipe.

There are problems associated with the forgoing wellscreens and their construction. For example, a conventional vacuum furnace used to manufacture the sintered mesh material needed for the filter elements restricts the maximum size of the mesh material, typically to two feet by four feet. This requires multiple sections of the sintered mesh material be welded together to produce filter elements greater than four feet in length. In a wellbore, wellscreen must typically extend as much as one hundred feet to fully access the surrounding formations. This results in many individual sections of sintered mesh material being welded together to form elements of the required lengths. Each layer of mesh must also be individually cut, wrapped around the base pipe, and then seam-welded. These numerous steps result in a labor-intensive process that is both expensive and requires significant manufacturing time.

In addition, the burst strength, or the ability of the wellscreen to withstand radially applied pressure, is limited to the weakest layer. This is important because hydrocarbons and sand from a surrounding formation may enter the wellbore and hit the wellscreen at high velocity. This problem exists in prior art wellscreens because each layer of mesh is individually assembled and there is a tendency for the layers to be extruded through the holes in the base pipe as radial pressure is applied from the outer diameter of the wellscreen. A similar problem exists with the layers being extruded through holes in the outer shroud as radial pressure is applied from the inner diameter of the wellscreen.

Therefore, a need exists for a wellscreen that is less expensive and requires less time to manufacture than conventional wellscreens.

There is a further need for a wellscreen that is more robust and exhibits higher burst pressure than conventional wellscreens.

There is yet a further need for a wellscreen that can be manufactured in a variety of lengths.

SUMMARY OF THE INVENTION

The present invention generally relates to an apparatus and method of manufacturing a wellscreen for subterranean use in oil, gas, and water wells. The present invention provides a method of manufacturing a wellscreen whereby layers of porous material are continuously sintered to a perforated metal strip to form a laminate, and the laminate is shaped to form a tube. The tube is then disposed over a base pipe and the ends of the tube are sealed to the base pipe.

In addition, the invention relates to a wellscreen comprised of a laminate shaped to form a tube, whereby the laminate includes a plurality of layers of continuously sintered porous material.

In one aspect of the invention, the laminate is either spiral welded or longitudinally welded into a straight tube.

In another aspect of the invention, the laminate is either spiral welded or longitudinally welded into coiled tubing.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figures 1, 4:
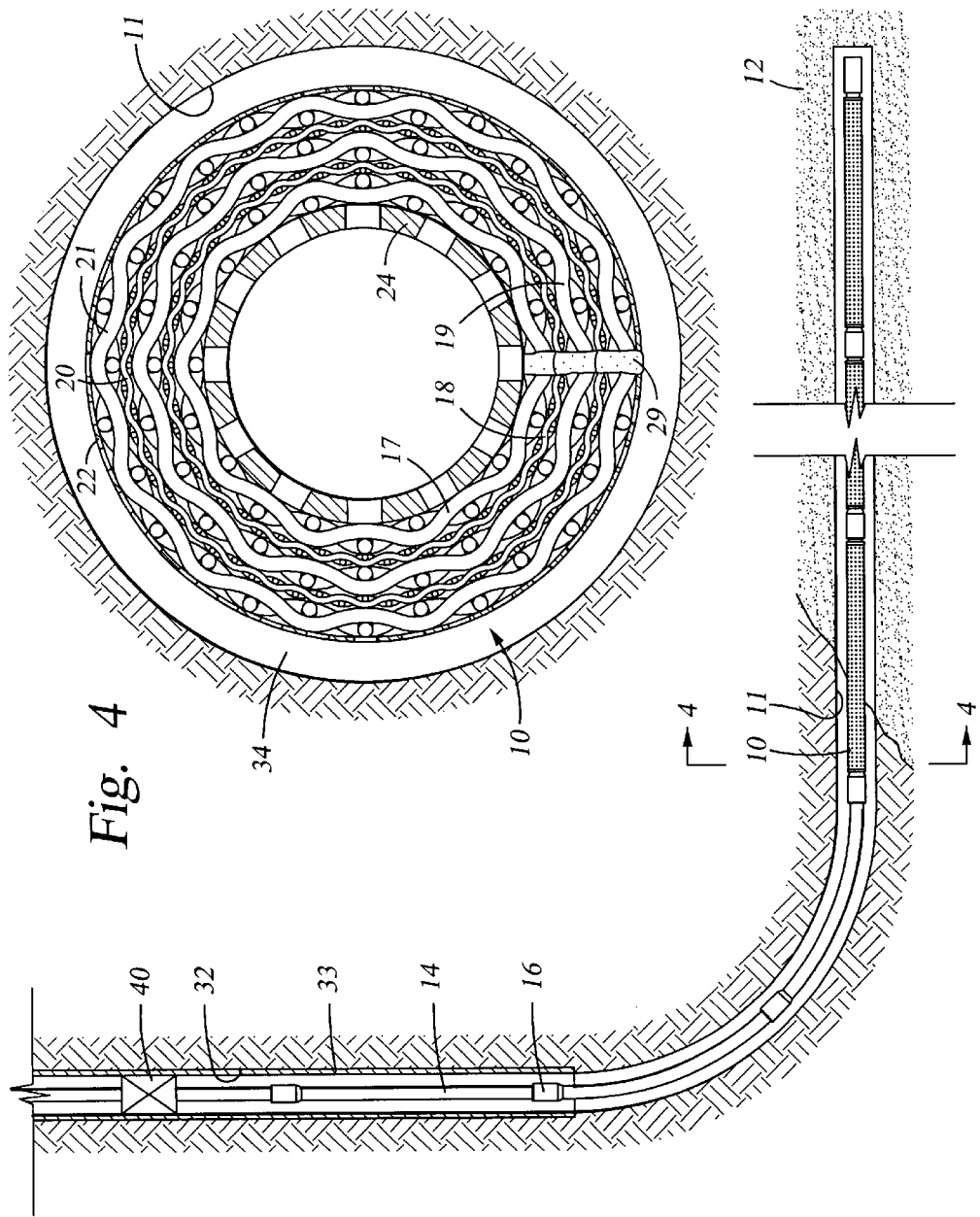
FIG. 1 is a sectional view showing a wellscreen in an uncased, horizontal wellbore.
FIG. 4 is a sectional end view of a wellscreen, showing the various layers of the screen, including the base pipe, filter and drainage mesh, and the outer shroud.

FIG. 1 is a sectional view showing a wellscreen 10 in an uncased, horizontal wellbore 11. The horizontal wellbore 11 is typically formed at the lower end of vertical wellbore 32 that is lined with casing 33. An annular area between the wellbore 32 and the casing 33 is filled with cement. Extending into the wellbore 32 from the surface of the well is a string of production tubulars 14 connected with joints 16. A packer 40 seals the annular area between the casing 33 and the string of production tubulars 14. The horizontal wellbore 11 is unlined to facilitate the flow of hydrocarbons into the wellbore. Disposed on the production string of tubulars 14 in the horizontal wellbore 11 are wellscreens 10 according to the present invention. Multiple wellscreens 10 are illustrated and are connected together end to end with joints 16. A hydrocarbon-bearing formation 12 adjacent the horizontal wellbore is illustrated.

Figure 2:
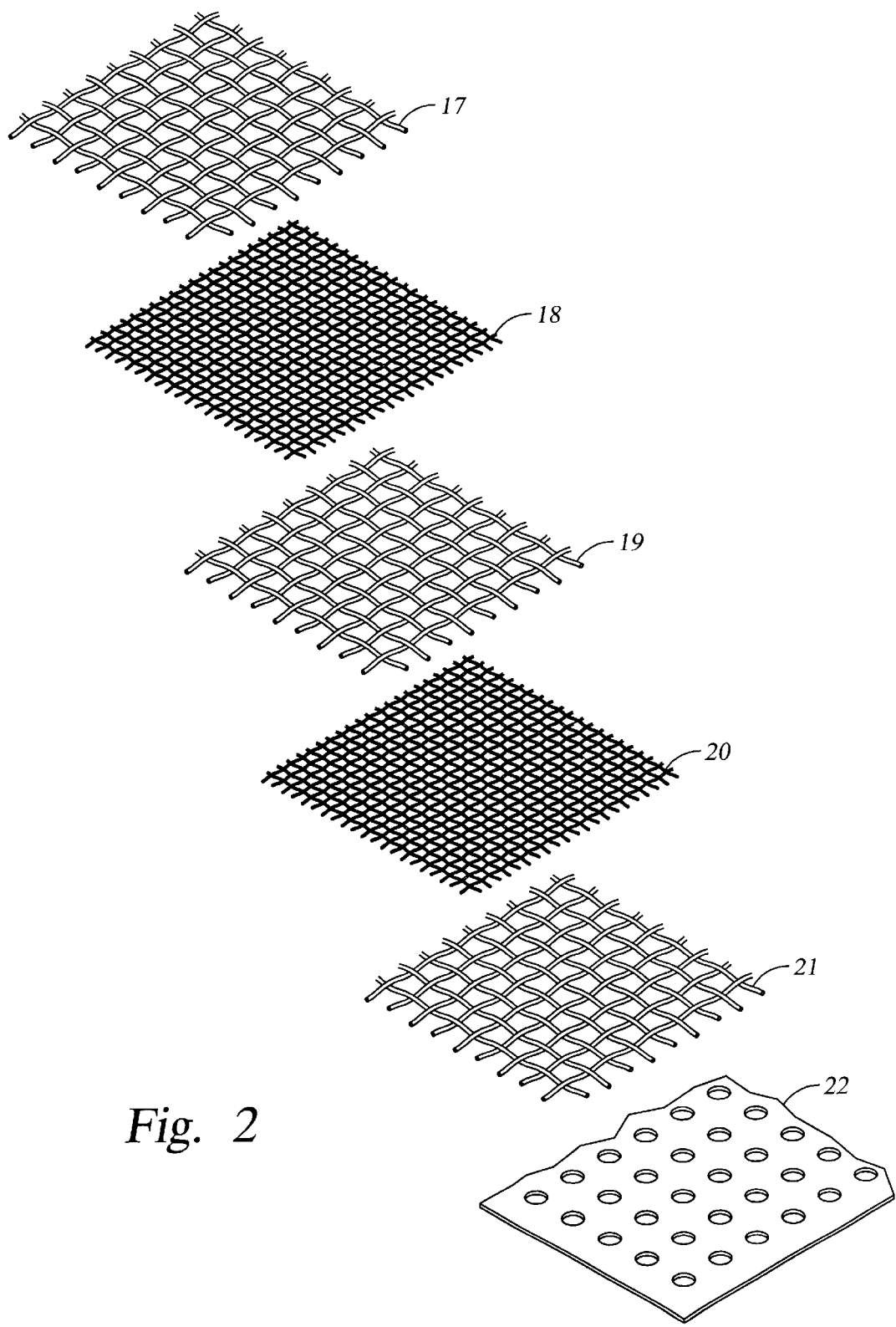
FIG. 2 is an exploded view illustrating individual layers of material used to construct the wellscreen.

The wellscreen of the present invention is constructed of multiple layers of similar and dissimilar materials. FIG. 2 is an exploded view showing the various layers of the wellscreen that are sintered together as part of the manufacturing process to form the wellscreen. The sintering process involves increasing the temperature of the various components to approximately eighty percent of the melting temperature and fusing the components together. The layers consist of: drainage mesh 17, filter mesh 18, drainage mesh 19, filter mesh 20, drainage mesh 21, and protective shroud 22. The alternating nature of the filter 18 and 20 and drainage 17, 19, and 21 meshes ensures filtering without restricting the flow of fluids into and along the surface of the wellscreen.

In addition, the sintering of the mesh layers 17–21 to the perforated plate used to construct the outer protective shroud 22 increases the burst pressure of the wellscreen by creating a single unit of laminated layers. The laminate created by the mesh layers and the perforated plate is much stronger than the individual layers of mesh, which, in prior art wellscreens, remain independent from one another after the manufacturing process.

Also, the use of the continuous sintering process does not restrict the length of the elements used in the construction of the wellscreen.

Figure 3:
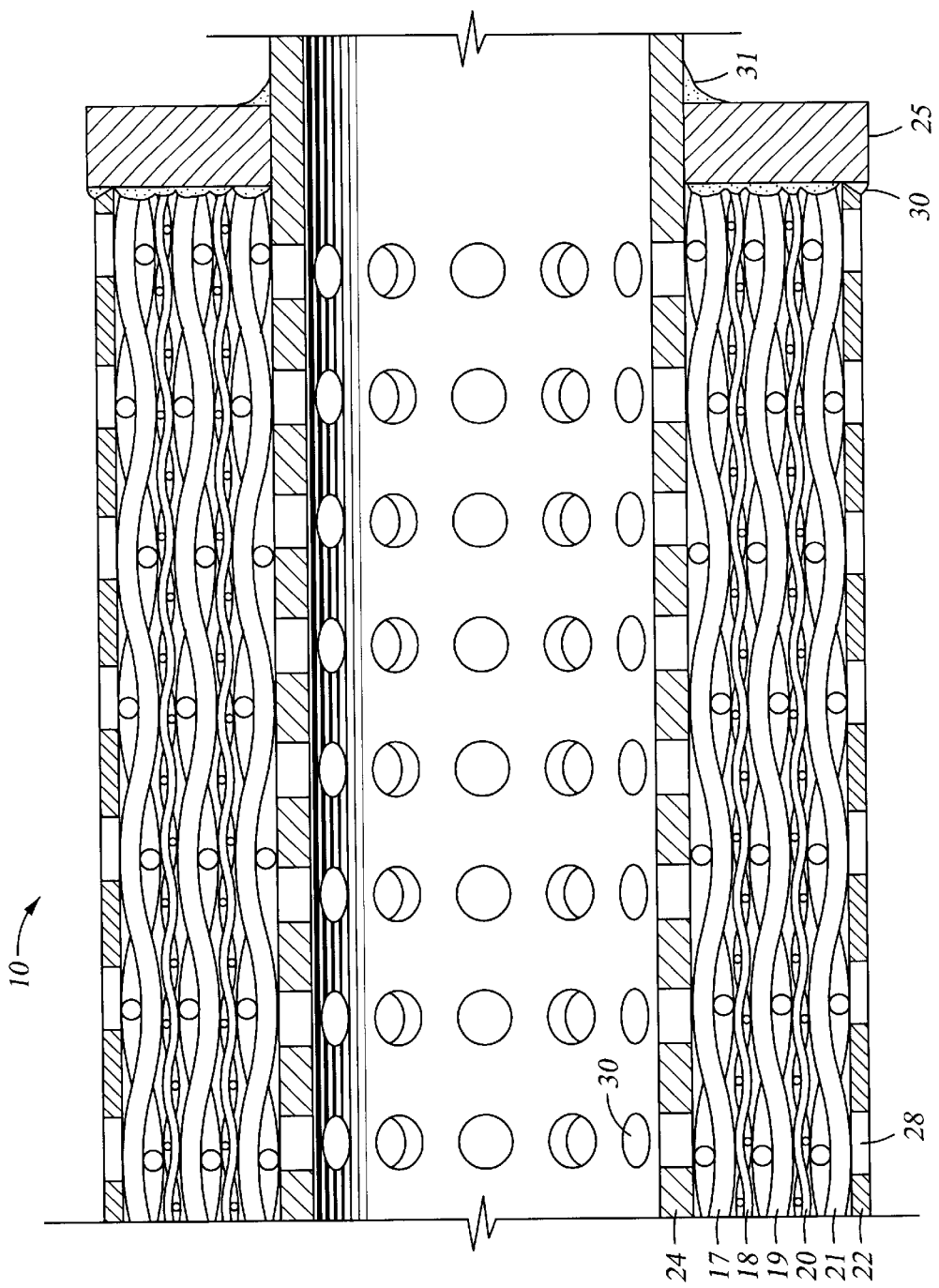
FIG. 3 is a sectional view of the wellscreen within a wellbore, showing the various layers of the screen, including the base pipe, filter and drainage mesh, and the outer shroud.

FIG. 3 is a sectional view of a portion of the wellscreen 10, after construction of the wellscreen 10 has been completed by shaping the sintered layers 17–22 into a tube, sliding the layers over a perforated base pipe 24, and welding on an end ring 25. The layers consist of: drainage mesh 17, filter mesh 18, drainage mesh 19, filter mesh 20, drainage mesh 21, and protective shroud 22. The opposite end (not shown) of the sintered layers 17–22 is identical to the end shown in FIG. 3. Typically, one end of the wellscreen 10 would consist of the male portion of a threaded coupling (not shown), while the other end of the wellscreen 10 would consist of the female portion of a threaded coupling (not shown). This allows a wellscreen 10 to be connected to a production string or additional wellscreens as needed.

As shown in FIG. 3, the outer perforated member 22 provides a protective layer for the internal components, namely filter mesh 18 and 20 and drainage mesh 17, 19, and 21. The outer member 22 should be constructed with a sufficient wall thickness to withstand the down hole radial pressures in the well, including pressure created by collapsing walls of the wellbore. A plurality of perforations 28 is formed in the outer member 22. The diameter and number of perforations 28 may be approximately the same as perforations 30 in inner member 24. The mesh layers 17–21 may be attached to inner member 24 using welded end ring 25, and sealed with weld metal 30 and 31.

FIG. 4 is a sectional end view of a wellscreen 10 within a wellbore 11. FIG. 4 includes the layers of filter mesh 18 and 20 and drainage mesh 17, 19, and 21 as well as protective shroud 22. These components have been sealed with weld metal 29, and disposed over a perforated base pipe 24. An annular area 34 exists between the wellscreen 10 and the wellbore 11.

As shown in FIGS. 1 and 4, the filter mesh 18 and 20 is a fine mesh material used to remove small particulates from the production fluid 12. In this manner, the production fluid 12 is filtered before it enters the production string 14 to prevent erosion of well machinery and hardware, and to prevent the production of particulate matter. The drainage mesh 17, 19 and 21 is a more coarse mesh material which serves as a spacer material between the filter mesh 18 and 20 and either the base pipe 24, outer protective shroud 22, or additional filter material 18 and 20. The drainage mesh 17, 19, and 21 reduces the pressure drop of the production fluid 12 as it passes through the wellscreen by allowing the production fluid 12 to pass through the entire surface area of the filter mesh 18 and 20. The drainage mesh 17, 19 and 21 also assists in conducting particulate through the filter mesh 18 and 20 that may otherwise clog the filter mesh 18 and 20 over time.

In one embodiment of the present invention, the outer member 22 is either 304 SS or 316 SS material. The drainage mesh 18 and 20 in one embodiment is 10×10 mesh of 316 SS material, and the filter mesh 17, 19, and 21 is comprised of 24×110 mesh of 316 SS material. The outside diameter of the tube formed by the laminate in one embodiment is about 2.5 to 7 inches in diameter, and the length of the tube is about 10 to 40 feet.

In a method of manufacturing the wellscreen, a significant number of steps are automated, thereby reducing manufacturing costs and time. For example, the plate that is used as the outer protective shroud is perforated in an automated process while it is still flat, prior to forming the tubular shape. Using this method, the edge of each piece of steel must be left intact to allow for a continuous seam when the tube is formed. The desired number of drainage and filter mesh elements are then placed on the flat perforated plate and sintered together in another automated process. The equipment used to sinter the pieces together utilizes a continuous sintering process and is capable of accommodating pieces of various lengths.

In addition to the processes described, the tube can be formed by shaping the laminate into a tubular shape and then utilizing either a straight or a spiral weld to seal the seams that are created when the flat plate is formed into the tube. Both the shaping and welding of the laminate may be accomplished in an automated process. This leaves only the final assembly, consisting of sliding the tube over a perforated base pipe and sealing the ends of the tube to the base pipe, as non-automated processes. Typically, the ends of the tube will be sealed to the base pipe by welding end rings to both the ends of the tube and the base pipe.

In an alternative embodiment, the base pipe of the wellscreen may be a section of perforated coiled tubing. In this embodiment, a laminate comprised of the layers in FIG. 2 are formed into a tubular shape, as previously described. The desired length of the tubular laminate is disposed over an equal length of perforated coiled tubing and is then sealed to the tubing by welding on end rings. The wellscreen with a perforated coiled tubing base pipe may be connected to standard, non-perforated coiled tubing used as production tubing. In this embodiment, a length of coiled tubing wellscreen can be manufactured and then added to the end of a length of standard coiled tubing. The entire length of standard and coiled tubing wellscreen can then be placed in a single reel and transported to a well site and inserted into a well. This embodiment could be used when the desired length of wellscreen was known before transporting the wellscreen to the production site. In this embodiment, the wellscreen and production tubing are both included on one spool of coiled tubing.

Alternatively, the standard coiled tubing and the coiled tubing wellscreen can be housed in separate spools. Utilizing tubing connectors, the coiled tubing wellscreen can be connected to standard coiled tubing used as production tubing. This method of use is especially useful when the desired length of wellscreen is not known prior to transporting spools of coiled tubing to a well site.

Figure 5:
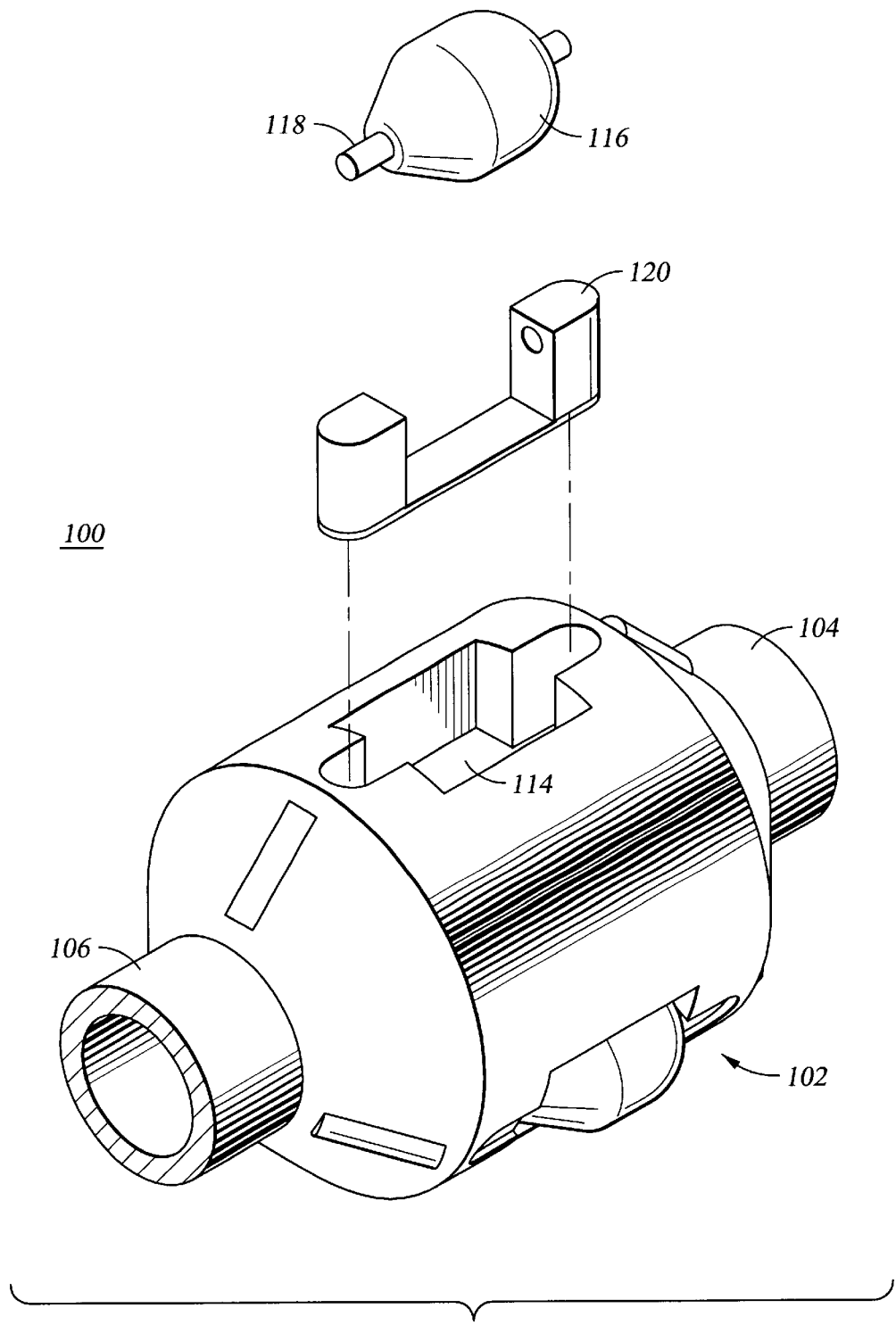
FIG. 5 is an exploded view of an exemplary expansion tool.

In an alternative embodiment of the invention, the wellscreen may be run into a horizontal wellbore and then its inner and outer diameter may be expanded through the use of an expander tool. FIG. 5 is an exploded view of an exemplary expansion tool 100. The expansion tool 100 has a body 102 which is hollow and generally tubular with connectors 104 and 106 for connection to other components (not shown) of a downhole assembly. The connectors 104 and 106 are of a reduced diameter compared to the outside diameter of the longitudinally central body part of the tool 100. The central body part has three recesses 114 to hold a respective roller 116. Each of the recesses 114 has parallel sides and extends radially from a radially perforated tubular core (not shown) of the tool 100. Each of the mutually identical rollers 116 is somewhat cylindrical and barreled. Each of the rollers 116 is mounted by means of an axle 118 at each end of the respective roller and the axles are mounted in slidable pistons 120. The rollers are arranged for rotation about a respective rotational axis that is parallel to the longitudinal axis of the tool 100 and radially offset therefrom at 120-degree mutual circumferential separations around the central body 102. The axles 118 are formed as integral end members of the rollers and the pistons 120 are radially slidable, one piston 120 being slidably sealed within each radially extended recess 114. The inner end of each piston 120 is exposed to the pressure of fluid within the hollow core of the tool 100 by way of the radial perforations in the tubular core. In this manner, pressurized fluid provided from the surface of the well, via a tubular, can actuate the pistons 120 and cause them to extend outward whereby the rollers 116 contact the inner wall of a tubular to be expanded.

Figure 6:
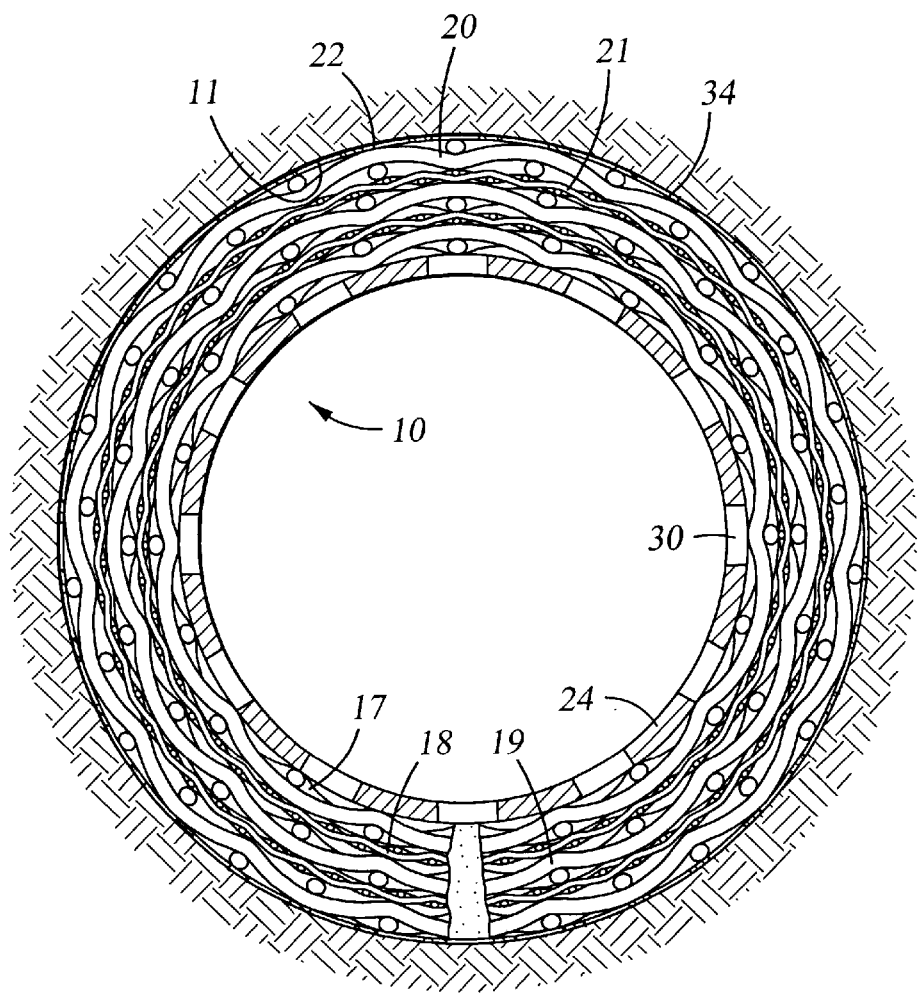
FIG. 6 is a sectional view of an expanded wellscreen within a wellbore, showing the various layers of the screen, including the base pipe, filter and drainage mesh, and the outer shroud.

In use the expander tool is run into the well on a separate string of tubulars or is run into the well disposed in the interior of the wellscreen and attached thereto with some temporary mechanical connection. In order to utilize the expander tool, the rollers are extended outwards radially to contact the inner walls of the wellscreen. By moving the actuated tool 100 within the wellscreen, both rotationally and axially, the screen is expanded to take on an appearance illustrated in FIG. 6, which is a cross section view of the expanded wellscreen 10 within the wellbore 11. FIG. 6 includes the layers of filter mesh 18 and 20 and drainage mesh 17, 19, and 21 as well as protective shroud 22. These components have been sealed with weld metal 29, and disposed over a perforated base pipe 24. By expanding the diameter of the wellscreen 10 until it contacts the wellbore 11, the annular area 34 is significantly reduced or eliminated. The wellscreen 10 is then able to provide support to the surface of the wellbore 11 and reduce the amount of sediment and debris that breaks free from the wellbore 11 and restricts the flow of production fluid through the wellscreen 10. If necessary, the wellscreen 10 may be annealed before being inserted into the wellbore 11 for improved ductility during the expansion process.

The present invention displays significant advantages over previous manufacturing methods. The advantages include the reduced time and cost of manufacturing. For example, many of the wellscreen manufacturing steps can be automated. The perforation of the outer protective shroud, the sintering of the mesh material, and the forming of the tubes are all automated processes. The only labor needed is sliding the tube (consisting of the outer protective shroud and mesh material) over the base pipe and welding on end rings.

Another advantage of the present invention is the increased burst pressure of the wellscreen. This is due to the strength of the laminate and its resistance to extruding through perforations in the base pipe or outer shroud.

Still a further advantage of the present invention is the ability to manufacture wellscreens in lengths greater than previous methods allowed.

While the foregoing is directed to embodiments of the present invention, other and further embodiments of the invention may be devised without departing from the basic scope thereof, and the scope thereof is determined by the claims that follow. For example, the number of either filter or drainage layers may be altered, depending on each application. In addition, material other than the mesh described may be used for either filter or drainage layers.

What is claimed is:

1. A method of manufacturing a wellscreen for use in a well, comprising:

continuously sintering a plurality of layers of porous material onto a perforated strip of metal to form a laminate;

spiral welding the laminate to form a tube;

disposing the tube over a perforated base pipe; and sealing the ends of the tube to the base pipe.

2. The method of claim 1, whereby the plurality of layers includes one or more mesh filter layers comprised of 24×110 316 SS mesh.

3. The method of claim 1, whereby the plurality of layers includes one or more mesh drainage layers comprised of 10×10 316 SS mesh.

4. A method of manufacturing a wellscreen for use in a well, comprising:

continuously sintering a plurality of layers of porous material onto a perforated strip of metal to form a laminate, wherein the plurality of layers includes one or more mesh filter layers comprised of 24×110 316 SS mesh;

shaping and spiral welding the laminate to form a tube;

disposing the tube over perforated base pipe; and sealing the ends of the tube to the base pipe.

5. A method of manufacturing a wellscreen for use in a well, comprising:

continuously sintering a plurality of layers of porous material onto a perforated strip of metal to form a laminate, wherein the plurality of layers includes one or more mesh drainage layers comprised of 10×10 316 SS mesh;

shaping and spiral welding the laminate to form a tube;

disposing the tube over perforated base pipe; and sealing the ends of the tube to the base pipe.

* * * * *